(No Model.)

A. METZ.
MEAT CUTTER.

No. 260,595. Patented July 4, 1882.

WITNESSES:
Theo. G. Hoster
C. Sedgwick

INVENTOR:
A. Metz
BY Munn & Co
ATTORNEYS.

UNITED STATES PATENT OFFICE.

ADAM METZ, OF BURLINGTON, IOWA.

MEAT-CUTTER.

SPECIFICATION forming part of Letters Patent No. 260,595, dated July 4, 1882.

Application filed March 21, 1882. (No model.)

*To all whom it may concern:*

Be it known that I, ADAM METZ, of Burlington, in the county of Des Moines and State of Iowa, have invented a new and Improved Meat-Cutter, of which the following is a full, clear, and exact description.

The invention consists in a meat-cutter constructed with a rocking knife suspended by means of rods from a rocking shaft, which shaft is connected by suitable connecting-rods with a rotating shaft suitably journaled in a standard, and provided with devices for rotating the shaft. The rocking knife being suspended from the rocking shaft, this knife cannot cut into the block, but only cuts the meat or other articles on this block.

Reference is to be had to the accompanying drawings, forming part of this specification, in which similar letters of reference indicate corresponding parts in both the figures.

Figure 1:
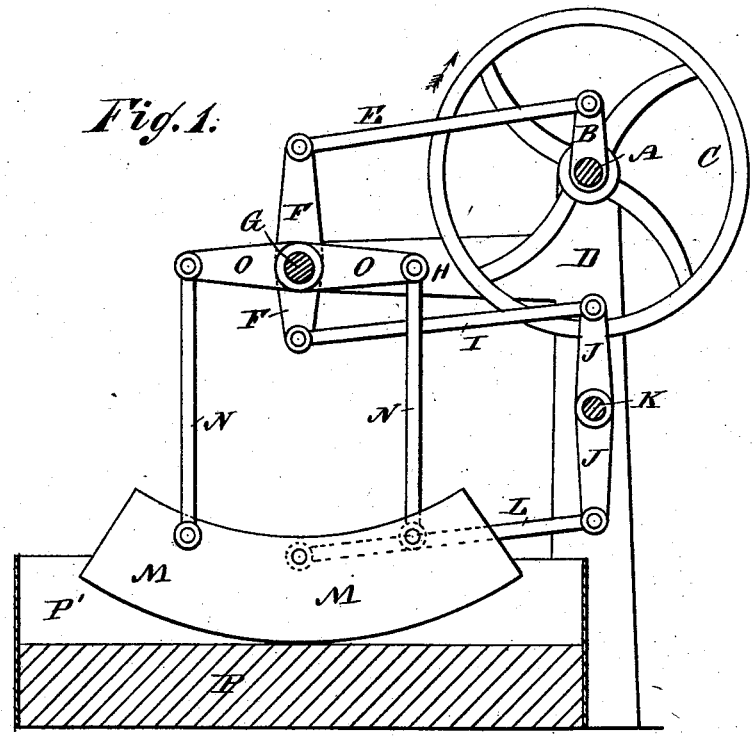
Figure 2:
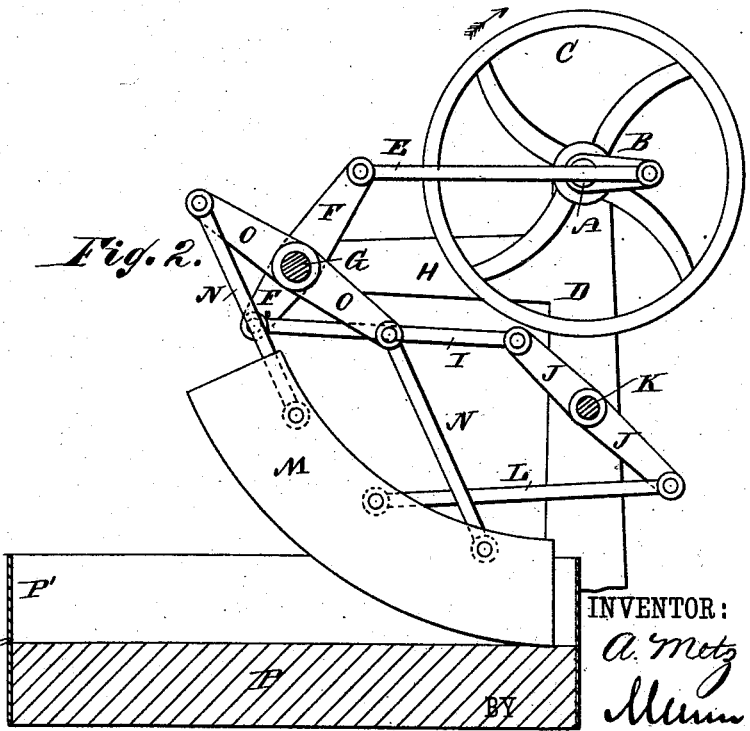

Figure 1 is a longitudinal sectional elevation of my improved meat-cutter, showing one of the knives as used and connected at rest. Fig. 2 is a longitudinal elevation of the same, showing the knife rocked.

A shaft, A, provided with a crank, B, and a fly-wheel, C, is journaled in a standard, D, and is also provided with devices for rotating it by hand or by machinery.

To the crank B a rod, E, is pivoted, the opposite end of which rod E is pivoted to one end of a transverse arm, F, attached rigidly to a shaft, G, journaled in the ends of a bracket-arm, H, of the standard D. To the other end of the arm F—that is, at the other side of the shaft G—is pivoted a connecting-rod, I, pivoted to the upper end of a transverse arm, J, on a shaft, K, journaled in the standard D, to the lower end of which arm J is pivoted a connecting-rod, L, having its other end pivoted to the middle of a segmental rocking knife, M. Two connecting-rods, N, are pivoted to the ends of this rocking knife M, and the upper ends of these rods N are pivoted to the ends of a transverse arm, O, on the shaft G, at right angles to the arm F. The knife M is adapted to rest on a block, P, preferably provided with a rim, P', which block can be fixed or be adapted to be adjusted vertically, and is also adapted to be rotated in some suitable manner. In place of one knife M, several knives may be used and connected.

In place of the transverse arms F, J, and O, two opposite single arms or cranks can be provided on each shaft G and K.

If the shaft A is rotated by hand or by means of a motor in the direction of its arrow, the upper end of the arm F will be drawn toward the shaft A, the lower end of this arm and the upper end of the arm J will be moved in the reverse direction, and the right-hand end of the arm O will be lowered and the left-hand end raised, whereby the knives will be rocked, as shown in Fig. 2. At the completion of a half-revolution of the shaft A the knife M will again be in the position shown in Fig. 1, and then the left-hand end of the arm O will be lowered and the right-hand end raised—that is, the knife M will be rocked in the other direction. The knife M can thus be rocked very easily by rotating the shaft A. The knife M is suspended by means of the rods N and arms O from the rocking shaft G, and is thus prevented from cutting into the block P, and only cuts the meat or other articles on the block P.

The principle and operation of the cutter are shown by one knife and its connections in the drawings. Two or more knives can be used and connected for operation, as may be required.

Having thus fully described my invention, I claim as new and desire to secure by Letters Patent—

In a meat-chopper, the combination, with the rocking knife M, of the rods N, the shaft G, the arms O and F, at right angles to each other on this shaft G, the rods E, I, and L, the shafts A and K, the arm J, and the crank B, substantially as herein shown and described, and for the purpose set forth.

ADAM METZ.

Witnesses:
ROBERT F. SCHMITT,
R. C. WADDLE.